United States Patent [19]

James et al.

[11] 4,252,757

[45] Feb. 24, 1981

[54] METHOD AND APPARATUS FOR MAKING FOAMED PLASTIC SLAB

[75] Inventors: James R. James, Novi, Mich.; Clarence D. Neil, Charleston, W. Va.

[73] Assignee: Accuratio Systems, Inc., Clarksville, Ind.

[21] Appl. No.: 37,638

[22] Filed: May 11, 1979

[51] Int. Cl.³ .............................................. B29D 27/04
[52] U.S. Cl. ...................................... 264/51; 264/139; 264/216; 264/DIG. 84; 425/224; 425/308; 425/817 C
[58] Field of Search ................ 264/51, 45.1, DIG. 84, 264/46.4, 45.8, 139, 216; 425/224, 817 C, 308

[56] References Cited

U.S. PATENT DOCUMENTS

| | | | |
|---|---|---|---|
| 3,061,885 | 11/1962 | Rogers et al. | 264/DIG. 15 |
| 3,141,206 | 7/1964 | Stephens | 264/45.8 X |
| 3,596,313 | 8/1971 | Darmochwal et al. | 425/817 C X |
| 3,632,706 | 1/1972 | Muller | 264/51 |

FOREIGN PATENT DOCUMENTS 1411517 10/1975 United Kingdom ............ 264/DIG. 84

Primary Examiner—Philip Anderson
Attorney, Agent, or Firm—Barnes, Kisselle, Raisch & Choate

[57] ABSTRACT

In the manufacture of foamed plastic slab by introducing foamable fluid from a mixing head into a moving conveyor-type mold, the improvement wherein supplemental quantities of the fluid are conducted from the mixing head longitudinally to locations where the main body of the material has foamed to partly expanded condition and friction between the sides of the mold and expanding material has caused the upper longitudinal side edges of the expanding material to assume a rounded shape which curves away from the mold sides leaving a space. The supplemental material is introduced into the spaces while the mold moves and upon expansion substantially fills the spaces and thereby greatly reduces the amount of the slab which must be cropped off prior to cutting it to form saleable articles.

25 Claims, 4 Drawing Figures

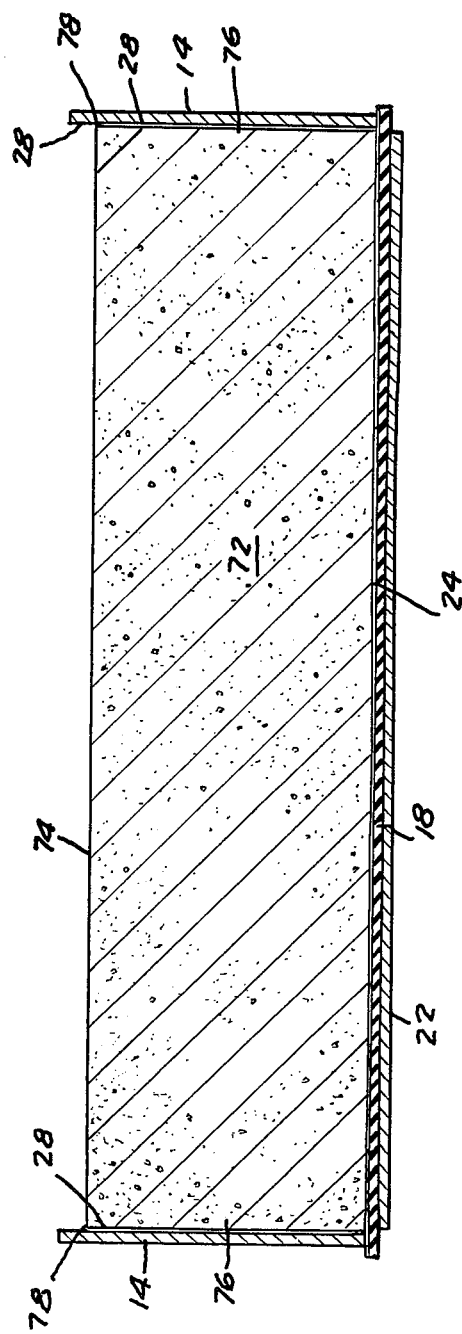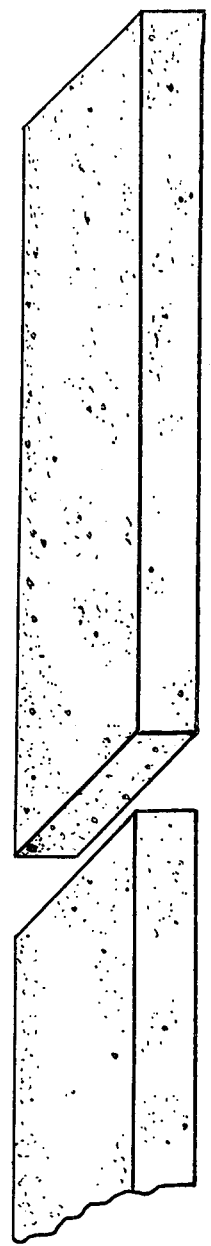
FIG. 3
FIG. 4

METHOD AND APPARATUS FOR MAKING FOAMED PLASTIC SLAB

This invention relates generally to the manufacture of foamed plastic slabs which are cut up to form such articles as mattresses, cushioning of various types, insulation and the like. More particularly, the invention involves an improved method and apparatus for making such slabs.

Conventionally the slabs are made continuously by pouring foamable fluid such as polyurethane or polyisocyanurate onto the bottom of a continuously moving conveyor-type mold having rectangular cross section and an open top. As the mold moves the fluid foams and expands upwardly. The sides of the mold frictionally resist upward expansion of the material engaged therewith, with the result that in the fully expanded and cured slab its upper longitudinal side edges, rather than being rectangular, are rounded or dome shaped. Before the slab can be used commercially its top must be cropped off to the depth of the domed configuration. This generates a great deal of waste.

Numerous efforts have been made to eliminate this doming, for example by manipulating the sides of the mold, applying pressure to the top of the expanding material or controlling the direction in which the material expands. All such previous efforts have had inherent disadvantages such as high equipment costs, difficulty of control and objectionable variations in the density of the slab.

The object of the present invention is to provide a relatively simple, inexpensive method and apparatus which are improved to form foamed plastic slab in which for practical purposes the doming of upper side edges is eliminated, the method and apparatus nevertheless being substantially free of disadvantages of the type referred to in the previous paragraph. One form of the invention is shown in the accompanying drawings wherein:

FIG. 3 is a sectional view on line 3—3 of FIG. 1;

FIG. 4 is a perspective view illustrating articles made from slab formed by the method and apparatus of this invention.

Figure 1:
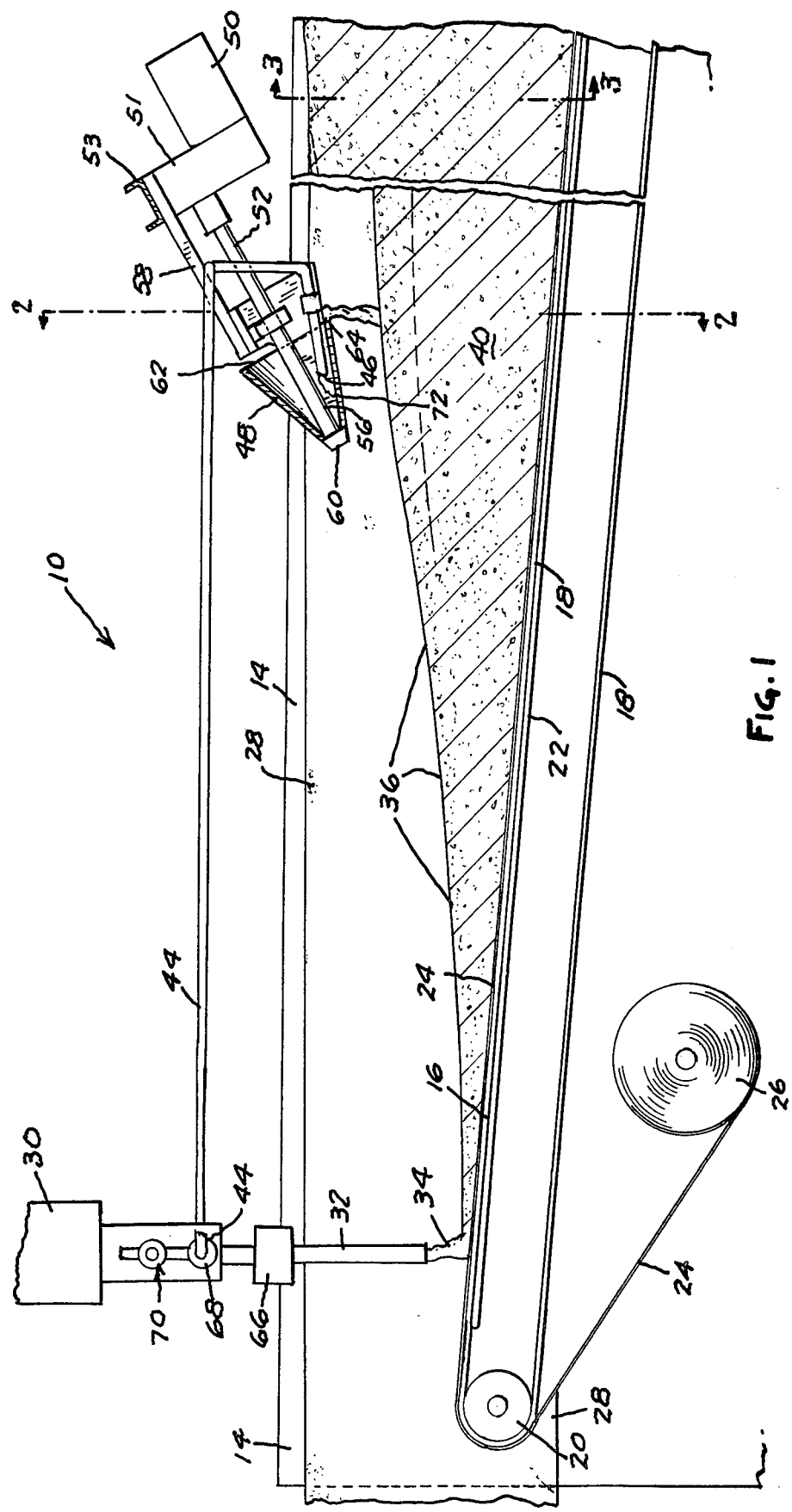
FIG. 1 is a partly diagrammatic view partly in side elevation and partly in section of apparatus according to the invention.

Shown in the drawings is an apparatus 10 which embodies the present invention and which includes a conveyor-type mold 12 having sides 14 and a bottom 16 which comprises the upper run of an endless belt 18 entrained around suitable rollers 20 (FIG. 1) at least certain of which are driven. Bottom 16 is slidably supported on a plate 22 or the equivalent. The upper surface of bottom 16 is lined with a layer of paper 24 or the equivalent drawn from a roll 26 and laid over bottom 16 as it passes around roller 20. Similarly the inner surfaces of mold sides 14 are lined with sheets of paper 28 drawn from rolls (not shown) and moved synchronously with the bottom paper liner 24. Thus the liners 24,28 provide the actual mold surfaces of conveyor 12. The structure thus far described is conventional.

The components of a foamable fluid such as polyurethane or polyisocyanurate are mixed in a conventional mixing head 30 and the resulting mixture passes into a dispensing tube 32 for dispensing onto bottom 16 as at 34 (FIG. 1). While for convenience, dispenser 32 is shown as a single stationary straight length of tube, it could be branched, have multiple outlets or be moveable if necessary or desirable to spread the foamable fluid over floor 16 of the mold. While the fluid is being dispensed into the mold, mold bottom 16 together with its paper layer 24 and the paper side liners 28 are moved relative to mixing head 30 and dispensing tube 32 to the right as FIG. 1 is viewed. During this movement the fluid material foams and expands upwardly as represented by sloped line 36 (FIG. 1). However the sides of the mold frictionally resist upward expansion of the material engaged therewith which results in a domed or rounded corner 38 at each upper longitudinal side edge of the foamed mass of material 40.

In accordance with the invention a supplemental quantity of the foamable fluid material is introduced into the space 42 between each upper rounded side edge 38 and the adjacent side 14 of the mold. When this supplemental material foams and expands it fills space 42 and substantially eliminates rounded edge 38. To this end, in the illustrated form of the invention, mixing head 30 is tapped by a pair of conduits 44 each of which conducts a supplemental quantity of the foamable fluid material downstream to a point generally above the space 42 where the main body 40 of foaming material has foamed in the range of about 35% to about 60% of complete.

At this point the supplemental material discharges from its respective conduit 44 through an outlet 46 (FIG. 1) into a receptacle 48 which is rotated by a motor 50 through a gear box 51 and shaft 52 mounted on a frame member 53. A blade 54 is mounted in substantially fixed position within receptacle 48 by means of a tube 56 having a bracket 58 anchored to frame member 53. Drive shaft 52 extends rotatably through tube 46 for connection to the lower closed end portion 60 of receptable 48.

Each receptacle 48 has an open upper end 62 through which the supplemental fluid material is received and which defines a lip 64 over which the supplemental material overflows for introduction into spaces 42. The rate at which the main body of foamable fluid is introduced into mold 12 is regulated by conventional circuitry or controls. A gate valve 66 is mounted in dispensing tube 32 to provide back pressure for forcing the supplemental material from mixing head 30 into conduits 44. The rate at which supplemental fluid flows through conduits 44 is controlled by a conventional needle valve, gear pump, tubing pump or the equivalent 68 connected into each conduit in cooperation with related circuitry or controls indicated diagrammatically at 70.

In use it will be assumed that endless belt 18 is operated so that bottom 16 of mold 12 is moving longitudinally away from mixing head 30. The mixing head is in operation and the foamable fluid is flowing through dispensing tube 32 for deposit on mold bottom 16. Valve 66 has been adjusted to create back pressure for forcing supplemental fluid into conduits 44 and valves or pumps 68 have been actuated so that the supplemental fluid is moving through conduits 44 toward outlets 46.

Figure 2:
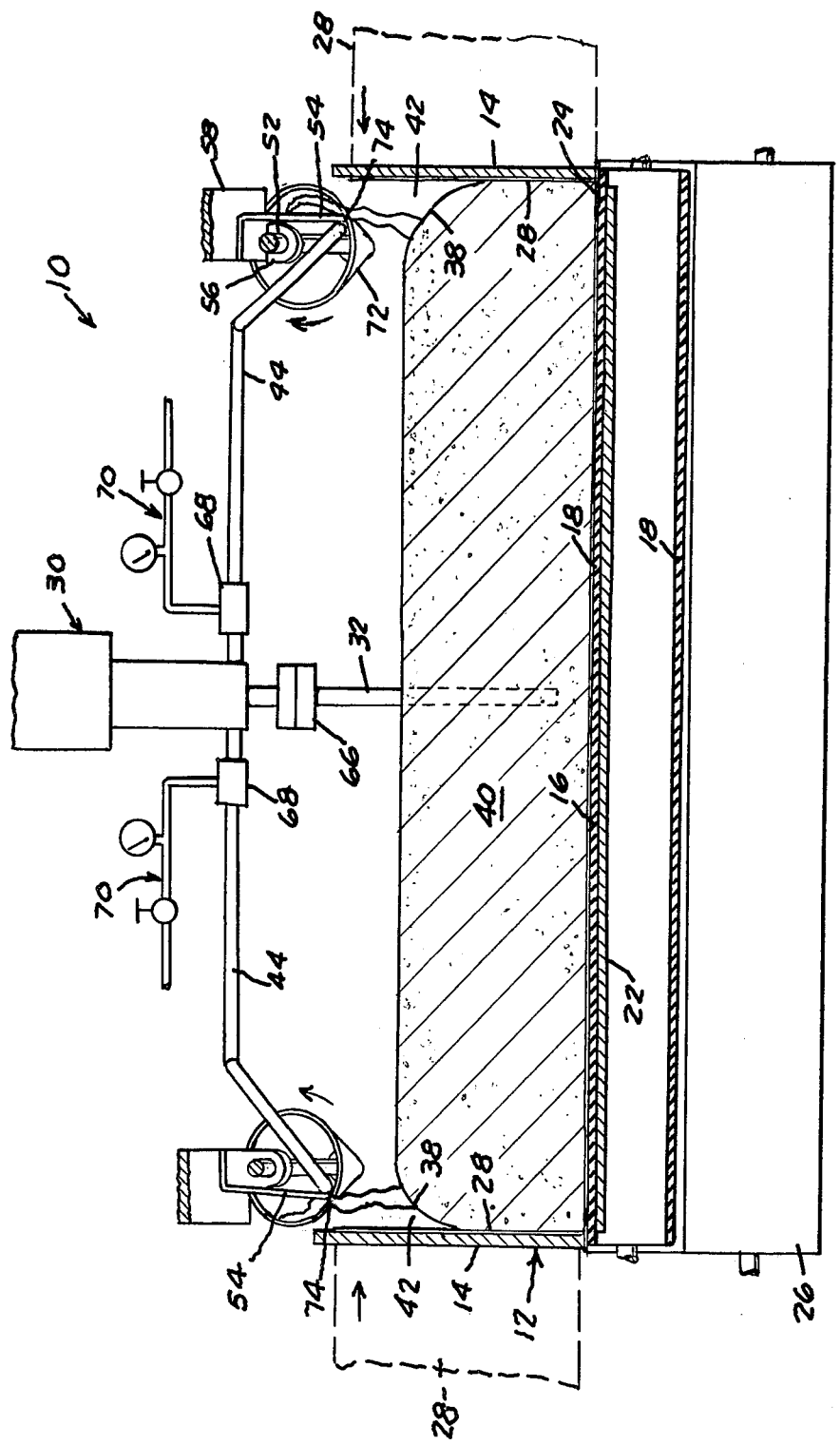
FIG. 2 is a sectional view on line 2—2 of FIG. 1.

The supplemental fluid begins to age chemically while moving through conduits 44 thereby generating gas. The supplemental fluid is delivered through conduit outlets 46 into receptacles 48 at the inboard sides of blades 54 (FIG. 2) and is carried around to the outboard sides of the blades by rotation of receptacles 48. The blades block further rotation of the supplemental fluid, thereby agitating the fluid which promotes degassing thereof. When the supplemental material partially fills receptacle 48 it overflows lips 64 on the receptacles in degassed condition. Blades 54 assist in forcing the material over lips 64 by a plowing action. Receptacles 48 are positioned so that the material overflowing lips 64 becomes deposited on portions of rounded upper longitudinal side edge 38 spaced laterally inwardly of mold sides 14 as shown in FIG. 2. My experiments indicate that this lateral spacing may preferably lie in the range of from about 5 inches to about 15 inches. The supplemental material then flows downward on curved side edges 38 toward mold sides 14. The supplemental fluid may be regarded as being introduced into spaces 42 when it is deposited on side edges 38.

Thereafter the main body 40 of the foaming material and the supplemental bodies of material continue to age or foam and expand together until the expansion is complete. During this expansion spaces 42 are substantially filled. The completed plastic foam slab 72 (FIG. 3) has a top 74 and sides 76 which adjoin in upper longitudinal corners 78. As is conventional the top, sides and bottom of slab 72 are then trimmed to a depth of from about ¼ inch to about 1 inch to remove the skin which forms on the exterior of the slab during the foaming process. If any vestige of spaces 42 remains in slab 72 they are shallow enough to be removed in this trimming process. Thus even though some trace of spaces 42 may remain in slab 72, for practical purposes the supplemental foaming material has substantially completely filled and eliminated spaces 42. The rounded upper side edges 38 of the conventional slab, typically about 4 to 6 inches deep, are eliminated and top portion 74 of the slab need not be cropped to any depth greater than necessary to remove the skin therefrom.

My experiments indicate that in the best mode of practicing the present invention it will probably be advisable to allow the supplemental material to age chemically to a certain extent before it is introduced into spaces 42. Further it may be preferable that the supplemental material be aged to roughly the same extent as the main body 40 of material at the point where the supplemental material is introduced into spaces 42. Moreover it appears that it will be desirable to vary the extent of aging of the supplemental material in different applications of the invention. This can be accomplished by varying the length and/or diameter of ducts 44 and varying the capacity, shape and orientation of receptacles 48.

In a typical apparatus according to the invention receptacles 48 are generally cone shaped as shown with the side walls of the cone being angled to the central axis thereof at about 30°. The receptacles measure about 10 inches from their tops 62 to their lower ends 60 and they are oriented so that their lower edges 72 are angled a few degrees from the horizontal. When the conical form of receptacles 48 is employed it is believed that this angle will vary from about 0° to about 45° depending on the amount of aging required before the supplemental material is introduced into spaces 42. In the apparatus illustrated blades 54 have generally triangular shape, their outer edges 74 being substantially parallel to and spaced slightly from the conical side wall of receptacles 48.

The invention is not limited to the particular form of the invention disclosed herein. To the contrary the invention is broad enough to cover any method and apparatus in which a body of supplementary foamable fluid, appropriately chemically aged if necessary and degassed if necessary, is introduced into spaces 42 in such quantity that when the supplementary material and the main body of material 40 have completely expanded they form a slab 72 of material whose longitudinal upper side corners 78 are substantially free of any doming or rounding which is not removed in the conventional skin-removing process.

Slab 72 made in accordance with the method and apparatus of this invention not only has upper side edges 78 substantially free of doming but for all practical purposes the density of the slab is substantially uniform throughout. Elimination of the doming results in a saving of 10 percent to 15 percent in the cost of the foaming fluid materials. Apparatus according to the invention is both relatively inexpensive and relatively easy to control.

Previous efforts to eliminate doming in plastic slabs have involved attempts to control in one way or another the foaming plastic as it expands. In contrast the present invention lets nature take its course while the main body 40 of the foaming material is expanding. Then the supplemental material is added to fill the gaps left by nature, i.e. spaces 42.

We claim:

1. In the method of making foamed plastic slab by introducing a volume of foamable fluid material from a source into a conveyor-type mold having a bottom and sides at a first location, while so introducing said material effecting relative longitudinal movement of said source and mold, and permitting said material to foam and expand within the confines of said mold during said relative movement, the improvement which comprises, during said relative movement conducting supplemental quantities of said fluid material to a second location spaced longitudinally from said first location, selecting said second location so that it is adjacent a portion of said volume of material which is foamed to at least partially expanded condition in said mold and at which lateral spaces have been formed between said sides and rounded upper longitudinal edges of said portion resulting from friction between said sides and the expanding material, during said relative movement introducing said supplemental quantities of material so conducted into said spaces, thereafter permitting said volume and supplemental quantities of material to expand completely and cure to form said slab, and selecting said supplemental quantities so that in completely expanded condition they substantially fill said spaces.

2. In the method of making foamed plastic slab by introducing a volume of foamable fluid material from a source into a conveyor-type mold having a bottom and sides at a first location, while so introducing said material effecting relative longitudinal movement of said source and mold, and permitting said material to foam and expand within the confines of said mold during said relative movement, the improvement which comprises, during said relative movement conducting supplemental quantities of said fluid material to a second location spaced longitudinally from said first location, selecting said second location so that it is adjacent a portion of said volume of material which is foamed to at least partially expanded condition in said mold and at which lateral spaces have been formed between said sides and rounded upper longitudinal edges of said portion resulting from friction between said sides and the expanding material, during said relative movement introducing said supplemental quantities of material so conducted into said spaces, thereafter permitting said volume and supplemental quantities of material to expand completely and cure to form said slab, and selecting said supplemental quantities so that and selecting said supplemental quantities so that in completely expanded condition, they substantially fill said spaces, and between said steps of conducting and introducing said supplemental quantities of material subjecting the same to agitation to promote degassing thereof.

3. The method defined in claim 2 wherein during said conducting, agitation and introducing steps said supplemental quantities of material is caused to chemically age or foam to approximately the chemical age of said volume of material at said second location.

4. The method defined in claim 3 wherein at said second location said volume and supplemental quantities of material are chemically aged to a condition in which they are foamed in the range of about 35 percent to about 60 percent of complete.

5. The method defined in claim 1 wherein said relative movement and said introducing steps are performed continually while making said slab.

6. The method defined in claim 5 wherein said mold is moved relative to said source, said supplemental quantities being conducted from said source to said second location in the direction of movement of said mold.

7. The method defined in claim 1 wherein said supplemental quantities is conducted from said source to said second location.

8. The method defined in claim 1 wherein said supplemental quantities is so introduced by depositing the same on portions of said rounded upper longitudinal edges which are spaced laterally from said sides of said mold.

9. The method defined in claim 8 wherein the lateral spacing of said portions of said rounded upper longitudinal edges from said sides is in the range of from about 5 inches to about 15 inches.

10. The method defined in claim 4 wherein said relative movement and said introducing steps are performed continually while making said slab, said supplemental quantities being so introduced by depositing the same on portions of said rounded upper longitudinal edges which are spaced laterally from said sides of said mold in the range of from about 5 inches to about 15 inches.

11. The method defined in claim 10 wherein said mold is moved relative to said source, said supplemental quantities being conducted from said source to said second location in the direction of movement of said mold.

12. In an apparatus for making foamed plastic slab which includes a conveyor-type mold having a bottom and sides, a source of foamable fluid material, means for introducing a volume of said material into said mold at a first location, and means operable to effect relative longitudinal movement of said source and mold while said material is so introduced, the improvement which comprises, a source of a supplemental quantity of said material, conduit means effective to conduct said supplemental material from the latter said source to a second location spaced longitudinally from said first location, said second location being adjacent a portion of said volume of material which is foamed to at least partially expanded condition in said mold and at which lateral spaces have been formed between said sides and rounded upper longitudinal edges of said portion resulting from friction between said sides and the expanding material, said conduit means having outlet means positioned to deliver said supplemental material therein generally adjacent said second location for introduction into said spaces.

13. In an apparatus for making foamed plastic slab which includes a conveyor-type mold having a bottom and sides, a source of foamable fluid material, means for introducing a volume of said material into said mold at a first location, and means operable to effect relative longitudinal movement of said source and mold while said material is so introduced, the improvement which comprises, a source of a supplemental quantity of said material, conduit means effective to conduct said supplemental material from the latter said source to a second location spaced longitudinally from said first location, said second location being adjacent a portion of said volume of material which is foamed to at least partially expanded condition in said mold and at which lateral spaces have been formed between said sides and rounded upper longitudinal edges of said portion resulting from friction between said sides and the expanding material, said conduit means having outlet means positioned to deliver said supplemental material therein generally adjacent to said second location for introduction into said spaces, and agitating means positioned to receive the supplemental material delivered through said outlet means and being operable to agitate said material to promote degassing thereof, said agitating means having outlet means positioned to introduce the degassed material into said spaces.

14. The apparatus defined in claim 13 wherein said agitating means comprises a receptacle having an upper open portion through which said supplemental material is received, said outlet means of said receptacle comprising a lip thereon over which said supplemental material overflows.

15. The apparatus defined in claim 14 wherein said agitating means also includes blade means within said receptacle and motor means operable to effect relative movement of said receptacle and blade means.

16. The apparatus defined in claim 15 wherein said motor means is operable to move said receptacle.

17. The apparatus defined in claim 16 wherein said receptacle has a cross section which is substantially circular about a central axis, said motor means being operable to rotate said receptacle about said axis.

18. The apparatus defined in claim 17 wherein said blade means is substantially stationary within said receptacle.

19. The apparatus defined in claim 18 wherein said receptacle has an open end which defines said upper open portion and said lip, said receptacle tapering generally conically inwardly from said open end to a closed end.

20. The apparatus defined in claim 19 wherein said axis is oriented so that the lowermost portion of said receptacle is angled to the horizontal in the range from about 0° to about 45°.

21. The apparatus defined in claim 19 wherein said blade means has an edge portion tapered to substantially parallel the taper of said receptacle.

22. The apparatus defined in claim 12 wherein said volume of material and said supplemental material have the same source.

23. The apparatus defined in claim 12 and including means effective to deposit supplemental material so delivered on portions of said rounded upper longitudinal edges which are spaced laterally from said sides of said mold for introduction into said spaces.

24. The apparatus defined in claim 23 wherein the latter said means is positioned so to deposit said supplemental material on portions of said rounded upper longitudinal edges which are spaced from said sides in the range of from about 5 inches to about 15 inches.

25. In an apparatus for making foamed plastic slab which includes a conveyor-type mold having a bottom and sides, a source of foamable fluid material, means for introducing a volume of said material into said mold at a first location, and means operable to effect relative longitudinal movement of said source and mold while said material is so introduced, the improvement which comprises, a source of a supplemental quantity of said material, conduit means effective to conduct said supplemental material from the latter said source to a second location spaced longitudinally from said first location, said second location being adjacent a portion of said volume of material which is foamed to at least partially expanded condition in said mold and at which lateral spaces have been formed between said sides and rounded upper longitudinal edges of said portion resulting from friction between said sides and the expanding material, said conduit means having outlet means positioned to deliver said supplemental material therein generally adjacent said second location for introduction into said spaces, and means effective to deposit supplemental material so delivered on a portion of said rounded upper longitudinal edges which are spaced laterally from said sides of said mold for introduction into said spaces, the latter means comprising agitating means positioned to receive the supplemental material delivered through said outlet means and being operable to agitate said material to promote degassing thereof, said agitating means having outlet means positioned to deposit said supplemental material into said spaces.

* * * * *

UNITED STATES PATENT AND TRADEMARK OFFICE
CERTIFICATE OF CORRECTION

PATENT NO. : 4,252,757
DATED : February 24, 1981
INVENTOR(S) : James R. James & Clarence D. Neil It is certified that error appears in the above—identified patent and that said Letters Patent are hereby corrected as shown below:

In column 5, line 12, delete "and selecting said supplemental quantities so that".

Signed and Sealed this

Nineteenth Day of May 1981

[SEAL]

Attest:

RENE D. TEGTMEYER

Attesting Officer

Acting Commissioner of Patents and Trademarks